No. 872,295. PATENTED NOV. 26, 1907.
J. L. HIXSON & C. W. POWELL.
TIRE SETTING MACHINE FOR RUBBER TIRES.
APPLICATION FILED MAY 16, 1906.
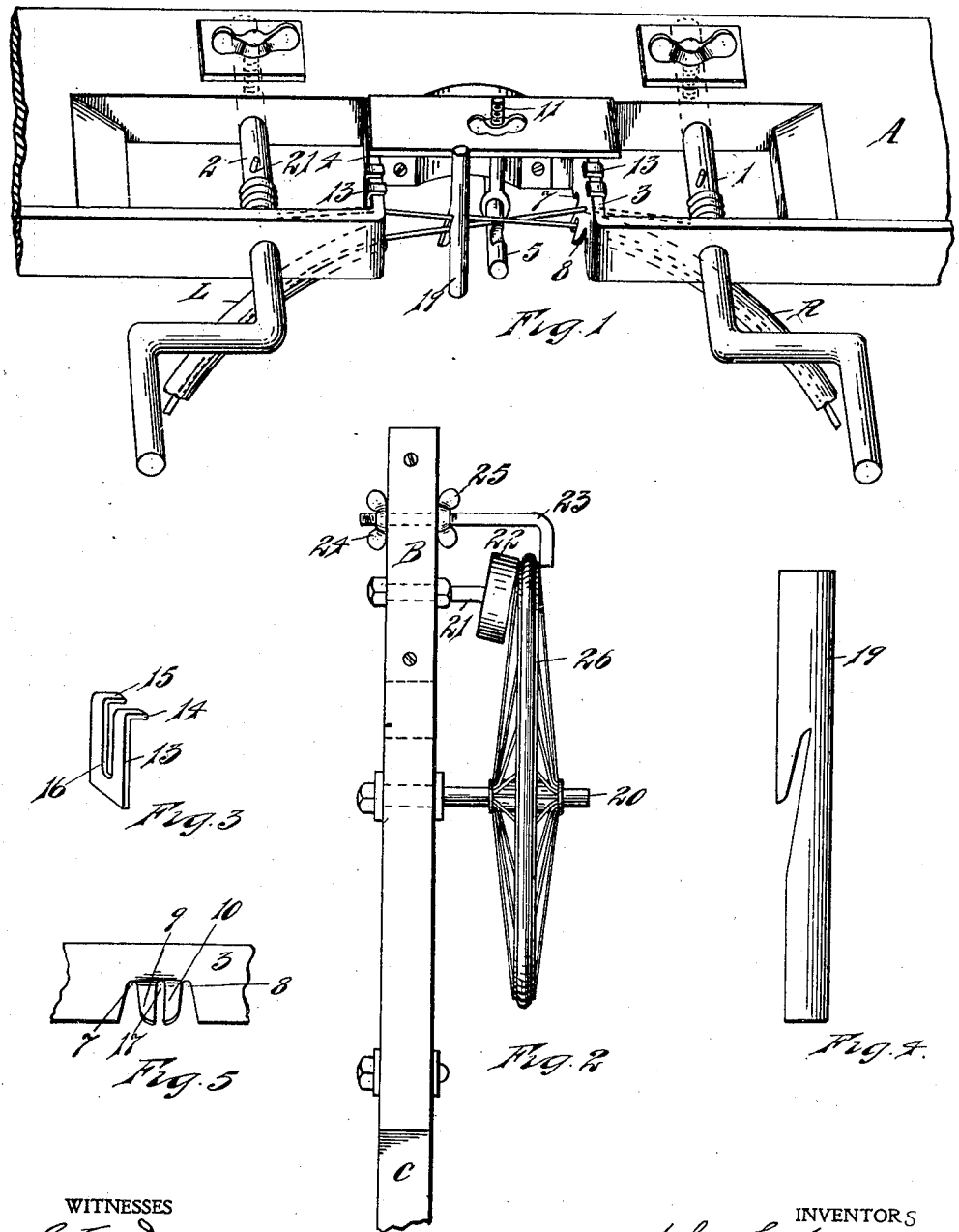
WITNESSES
INVENTORS
John L. Hixson,
Carles W. Powell.
By Parker & Burton Attorneys.

UNITED STATES PATENT OFFICE.

JOHN L. HIXSON AND CHARLES W. POWELL, OF YPSILANTI, MICHIGAN.

TIRE-SETTING MACHINE FOR RUBBER TIRES.

No. 872,295.     Specification of Letters Patent.     Patented Nov. 26, 1907.

Application filed May 16, 1906. Serial No. 317,121.

*To all whom it may concern:*

Be it known that we, JOHN L. HIXSON and CHARLES W. POWELL, citizens of the United States, residing at Ypsilanti, county of Washtenaw, State of Michigan, have invented a certain new and useful Improvement in Tire-Setting Machines for Rubber Tires, and declare the following to be a full, clear, and exact description of the same, such as will enable others skilled in the art to which it pertains to make and use the same, reference being had to the accompanying drawings, which form a part of this specification.

This invention relates to tire setting machines; it has for its object an improved device for placing rubber tires upon grooved wheels, especially when the rubber tire is secured in place by means of a wire that is included within the body of the rubber.

The entire machine consists of two devices, one of which twists the ends of the securing wire together, after the wire has been threaded through the rubber tubing, which comprises the tire, and the other of which runs the tire onto the grooved wheel, after the ends of the wire have been secured by twisting as above described.

In the drawings:—Figure 1, shows the device for twisting the wire. Fig. 2, shows the device for running the tire onto the wheel. Fig. 3, is a small hanger employed to prevent the wire from cutting the rubber. Fig. 4, shows a tool used to twist the wire. Fig. 5, is an elevation showing a detail of the wire guide.

A indicates a frame provided with two plates, 3 and 4, and a stirrup 5, on which the wheel rests during the wire twisting operation. The plates 3 and 4 are provided with notches 7 and 8, in which the rim of the wheel engages during the wire twisting period; between the notches 7 and 8, is a hanger with branches 9 and 10, that extends into the groove of the wheel; a notch 17 between the branches 9 and 10, wide enough for the wire to engage easily through it, forms part of the wire guide. The plate, or at least that part of the plate which comprises the branches 9 and 10, of the hanger are arranged in a plane, which is radial to the hub of the suspended wheel and approximately perpendicular to the face of the rubber tire at this point. The two plates 3 and 4 are symmetrical and are equally located at the side of the stirrup 5; the stirrup 5 is loosely secured in the frame A, but is capable of vertical movement and is actuated by eye-bolt 11, the stem of which passes through a plate that rests on the plates 3 and 4. Through each of the plates 3 and 4, above the hanger, between the branches 9 and 10, is a hole through which the end of the wire is passed, and from thence the wire is carried to and secured to one of the winches 1 and 2; one end of the wire is secured to each winch; the preferable way of securing it is to pass the end of the wire through a hole in the winch and give the winch a turn. The wheel with the rubber tire and its included wire laid in the groove thereof, is placed on the hanger or stirrup 5 with the flanges of the groove of the wheel resting in the notches 7 and 8.

The wires are threaded from the right-hand side R, through the plate 4, and through the hole in the winch 21. Small hangers 13 are placed under the wire and over the top edges of the plates; the hangers engage by means of hooks 14 and 15; the wire engages in the bottom of the slot 16, and this coöperates with the notch 17 between the branches 9 and 10, to form a guide for the wire; the face of the hanger 13 engages against the end of the rubber tube, of which the tire is composed. The notches and the holes above them hold the wire firmly against the strain which is applied when they are twisted together by the use of the tool 19.

The wire from the left side L of the wheel is threaded through a hanger on plate 4, through a hole in plate 3, and through the hole in the winch shaft 1. The wire is now drawn tightly by turning the winches, drawing the tire down into the groove in the wheel; the wire where the two branches of it cross, is twisted with the tool 19, or with any similar or proper twisting tool. After the wire has been sufficiently twisted to secure the two ends together, the surplus wire is cut off and removed, and the wheel and the tire removed from the twisting part of the apparatus.

In measuring and twisting the wire, although it is measured and twisted upon the wheel upon which it will be used, or upon a wheel of the same size as that upon which it will be used, the rubber has been compressed and is so tightly drawn that it does not expand properly to cover the as yet uncovered portion of the wire, and it is loosened from the wheel or taken off from the wheel or the measuring wheel and immediately expands to cover the hitherto uncovered portion of the wire, and the ends of the rubber are now in close engagement; generally the compression is not all relieved and the rubber is still under some compression.

In order to place the tire properly upon the wheel, the second instrument of the set is used though I have found that it may be dispensed with. It consists of a frame B, to which is slidingly connected a sliding part C, carrying a hub spindle 20; the two parts of the frame B and C, being arranged to slide the one on the other in order that wheels of different size may have their tires set by the same machine.

On part B, is a short stud shaft 21, the upper end of which is inclined slightly to its main axis, and the inclined part carries a smooth faced rolling support 22. A hook 23, adjustable by means of thumb nut 24, and thumb-nut 25, overhangs one edge of the roller 22. The wheel 26 is placed on the spindle 20 and the frame is brought into relation such that the rim of the wheel rests on the roller 22 with the roller projecting beyond the rim so far that it will engage with the rubber tire. The rubber tire is placed manually in such relation to the wheel that some part of it engages in the groove, and it is drawn manually as nearly into the groove as it can be without much exertion, and the wheel is then turned on spindle 20, until the tire runs entirely into the groove, this can always be accomplished with one full turn of the tire, and generally with a very small part of the turn, if the operator is dexterous.

What I claim is:—

In a machine for mounting rubber tires on wheel fellies, in combination with abutments for the ends of the rubber tire, notched on the under side thereof and adapted to engage the retaining wire in said notch, notched hangers adapted to co-act with said abutments to form with said abutments a passage surrounded by the walls of said combined abutment and hanger, substantially as described.

In testimony whereof, we, sign this specification in the presence of two witnesses.

JOHN L. HIXSON.
CHARLES W. POWELL.

Witnesses:
GEORGE R. GUNN,
MATTHEW MAX.